United States Patent
Oda

(10) Patent No.: US 10,274,939 B2
(45) Date of Patent: Apr. 30, 2019

(54) FEED SHAFT CONTROL METHOD AND NUMERICAL CONTROL WORK DEVICE

(71) Applicant: MAKINO MILLING MACHINE CO., LTD., Tokyo (JP)

(72) Inventor: Mitsunari Oda, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 251 days.

(21) Appl. No.: 15/126,239

(22) PCT Filed: Mar. 14, 2014

(86) PCT No.: PCT/JP2014/056940
§ 371 (c)(1),
(2) Date: Sep. 14, 2016

(87) PCT Pub. No.: WO2015/136696
PCT Pub. Date: Sep. 17, 2015

(65) Prior Publication Data
US 2017/0083007 A1    Mar. 23, 2017

(51) Int. Cl.
*G05B 19/416* (2006.01)

(52) U.S. Cl.
CPC ............ *G05B 19/4166* (2013.01); *G05B 2219/32276* (2013.01); *G05B 2219/36521* (2013.01)

(58) Field of Classification Search
None
See application file for complete search history.

(56) References Cited

U.S. PATENT DOCUMENTS

| | | | |
|---|---|---|---|
| 5,250,880 A | 10/1993 | Chesney et al. | |
| 5,691,616 A | 11/1997 | Iwashita | |
| 2003/0205984 A1 * | 11/2003 | Yoshida | G05B 19/404 318/801 |
| 2006/0113946 A1 | 6/2006 | Okita et al. | |
| 2006/0158143 A1 * | 7/2006 | Okita | G05B 19/358 318/276 |
| 2006/0186845 A1 * | 8/2006 | Terada | G05B 19/19 318/432 |

(Continued)

FOREIGN PATENT DOCUMENTS

| | | |
|---|---|---|
| EP | 1 667 001 | 6/2006 |
| EP | 1 684 139 | 7/2006 |

(Continued)

OTHER PUBLICATIONS

International Search Report dated Apr. 8, 2014, directed to International Application No. PCT/JP2014/056940, 2 pages.

*Primary Examiner* — Tuan C Dao
(74) *Attorney, Agent, or Firm* — Morrison & Foerster LLP

(57) ABSTRACT

Provided is a feed shaft control method, wherein a speed feedback loop having a speed controller is disposed within a position feedback loop having a position controller, forming a cascade coupling, and an acceleration feedback signal which is outputted from a compensator on the basis of an output signal of an acceleration detector is subtracted from a torque instruction. Furthermore, the method implements control wherein a speed is acquired on the basis of the output signal of the acceleration detector, and a signal obtained by multiplying the acquired speed by a gain is added to a speed instruction which is outputted from the position controller.

11 Claims, 12 Drawing Sheets

(56) References Cited

U.S. PATENT DOCUMENTS

| | | | | |
|---|---|---|---|---|
| 2007/0260356 A1* | 11/2007 | Kock | .................... | B25J 9/1641 |
| | | | | 700/261 |
| 2007/0288124 A1* | 12/2007 | Nagata | ................... | B25J 9/1694 |
| | | | | 700/258 |
| 2008/0192074 A1* | 8/2008 | Dubois | ............... | B29C 67/0059 |
| | | | | 347/5 |
| 2009/0309526 A1* | 12/2009 | Yang | ........................ | H02P 6/16 |
| | | | | 318/400.07 |
| 2013/0138236 A1* | 5/2013 | Nagaoka | ................ | G05B 19/19 |
| | | | | 700/108 |

FOREIGN PATENT DOCUMENTS

| | | |
|---|---|---|
| JP | 2005-316937 | 11/2005 |
| JP | 2006-158026 | 6/2006 |
| JP | 2006-202019 | 8/2006 |
| JP | 2009-159774 | 7/2009 |
| WO | WO-2013/054662 | 4/2013 |

* cited by examiner

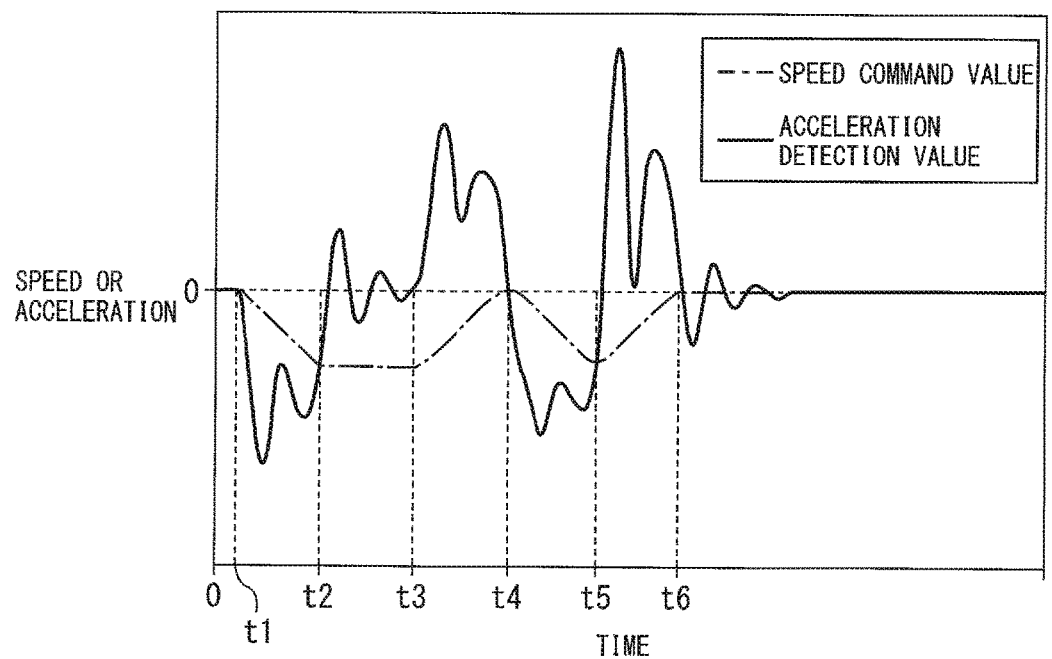
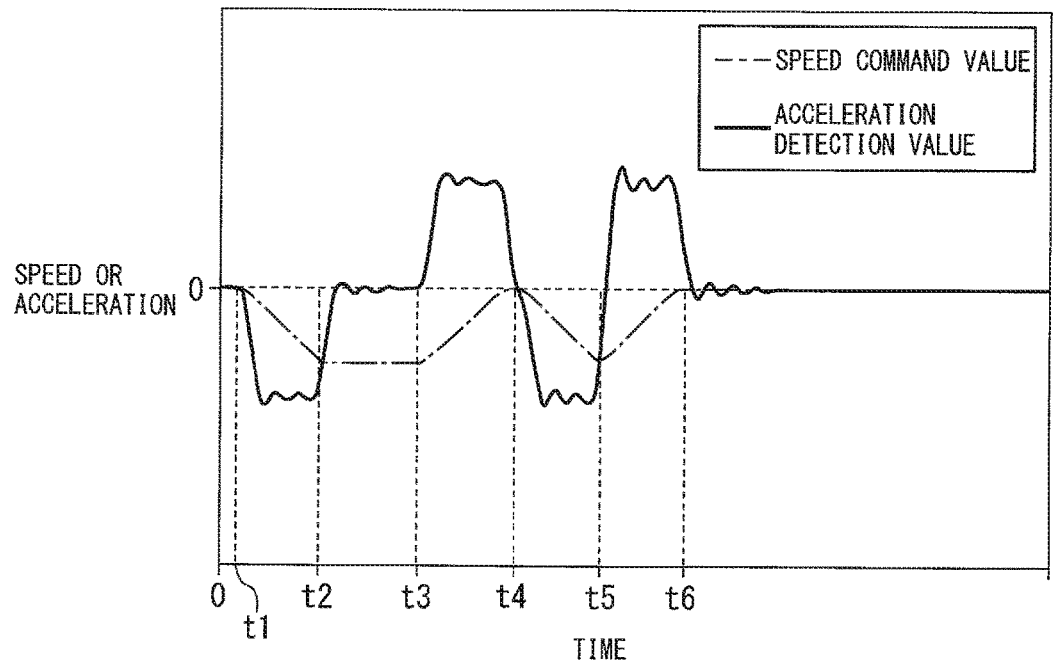

FEED SHAFT CONTROL METHOD AND NUMERICAL CONTROL WORK DEVICE

CROSS REFERENCE TO RELATED APPLICATIONS

This application is a U.S. National Phase patent application of International Patent Application No. PCT/JP2014/056940, filed Mar. 14, 2014, which is hereby incorporated by reference in the present disclosure in its entirety.

Field of the Invention

The present invention relates to a feed axis control method of a machine tool and a numerical control machine tool.

Background Art

In conventional techniques, a machine tool which performs machining, such as cutting by relatively moving a tool relative to a workpiece is known. Further, in such a machine tool, a numerical control machine tool which specifies a path of the tool by coordinates of a predetermined axis, and the like, and performs machining by automatically moving the tool relative to the workpiece is known. The numerical control machine tool can perform machining in a desired tool path and at a desired speed by specifying machine coordinates and a movement speed of the tool in a machining program.

Japanese Laid-open Patent Publication No. 2006-158026 discloses a control device of a machine tool in which a driven element driven by a servo motor is provided with an acceleration detection means. This control device perform correction by obtaining a speed estimation value by integrating an acceleration detection value detected by the acceleration detection means and subtracting a value in which the speed estimation value is multiplied by a coefficient and a value in which the acceleration detection value is multiplied by a coefficient from an electric current command determined by a speed control processing part. Then, the electric current command corrected by the control device is outputted to a servo amplifier.

SUMMARY OF THE INVENTION

In the control device which controls a servo motor which drives each of axes of the machine tool, a position controller generates a speed command based on a position command, and a speed controller generates a torque command based on the speed command. Then, the motor is driven based on the torque command. Further, it is known that a movement device which moves the tool and the workpiece is provided with the position detector and a position feedback loop which subtracts a position signal outputted from the position detector from the position command is arranged. In addition, it is known that the speed detector is disposed at an output axis of the servo motor, and the like and a speed feedback loop which subtracts a speed signal outputted from the speed detector from the speed command is arranged.

When the workpiece is machined by the machine tool, a disturbance force is applied to the movement device which moves the workpiece and the tool so that a vibration may be generated on the workpiece or the tool. For example, at a machine point at which the tool is in contact with the workpiece, a cutting load and the like are applied to the workpiece and the tool so that a vibration may be generated. To improve a machining accuracy, such a vibration of the workpiece and the tool is preferably restrained.

In the control device in Japanese Laid-open Patent Publication No. 2006-158026 as described above, an acceleration of the driven element is fed back to the torque command of the motor, thereby restraining the vibration. However, in such a circuit, the acceleration detection means is disposed at the driven element. In other words, the acceleration detection means is disposed at a position away from the output axis of the motor. Consequently, due to the feedback of the acceleration of the driven element, a position deflection is apt to be generated in the position command outputted from the position controller, and a speed deflection is apt to be generated in the speed command outputted from the speed detector. These deflections influence also upon a control of an electric current supplied to the motor, and there is a problem that an effect of restraining the vibration is reduced.

A first feed axis control method of the present invention is a feed axis control method of a machine tool, including forming a cascade connection in which a speed feedback loop including a speed control part into which a speed command is inputted is provided inside a position feedback loop including a position control part into which a position command is inputted, and controlling a servo motor for driving a feed axis in accordance with a torque command outputted from the speed control part. The feed axis control method includes obtaining an acceleration based on an output signal of a state sensor attached to at least one of a machine structure and an axis feed mechanism, and subtracting an acceleration feedback signal in which the obtained acceleration is multiplied by a predetermined first gain from the torque command outputted from the speed control part. The feed axis control method includes performing at least one of controls consisting of a control in which a speed is obtained based on the output signal of the state sensor and a signal in which the obtained speed is multiplied by a predetermined gain is added to the speed command outputted from the position control part and a control in which a position is obtained based on the output signal of the state sensor and a signal in which the obtained position is multiplied by a predetermined gain is added to the position command inputted into the position control part.

In the invention as described above, a speed is obtained based on an output signal of the state sensor, and a signal in which the obtained speed is multiplied by a predetermined second gain can be added to the acceleration feedback signal.

In the invention as described above, a signal in which the speed command outputted from the position control part is multiplied by a predetermined third gain can be subtracted from a signal multiplied by the second gain.

In the invention as described above, a position is obtained based on an output signal of the state sensor, and a signal in which the obtained position is multiplied by a predetermined fourth gain can be added to the acceleration feedback signal.

In the invention as described above, a signal in which the position command inputted into the position control part is multiplied by a predetermined fifth gain can be subtracted from a signal multiplied by the fourth gain.

In the invention as described above, a signal in which the torque command outputted from the speed control part is multiplied by a predetermined sixth gain can be subtracted from the acceleration feedback signal.

In the invention as described above, the first gain and the second gain can be set so that an additional value of a square of the first gain and a square of the second gain is a predetermined set value.

A second feed axis control method of the present invention is a feed axis control method of a machine tool, including forming a cascade connection in which a speed feedback loop including a speed control part into which a speed command is inputted is provided inside a position feedback loop including a position control part into which a position command is inputted, and controlling a servo motor for driving a feed axis in accordance with a torque command outputted from the speed control part. The feed axis control method includes obtaining an acceleration based on an output signal of a state sensor attached to at least one of a machine structure and an axis feed mechanism and subtracting an acceleration feedback signal in which the obtained acceleration is multiplied by a predetermined gain from the torque command outputted from the speed control part. The feed axis control method includes performing at least one of controls consisting of a control in which a speed is obtained based on the output signal of the state sensor and a signal in which the obtained speed is multiplied by a predetermined gain is added to the acceleration feedback signal and a control in which a position is obtained based on the output signal of the state sensor and a signal in which the obtained position is multiplied by a predetermined gain is added to the acceleration feedback signal.

A first numerical control machine tool of the present invention comprises a control device in which a cascade connection in which a speed feedback loop including a speed control part into which a speed command is inputted is provided inside a position feedback loop including a position control part into which a position command is inputted is formed, and which controls a servo motor for driving a feed axis in accordance with a torque command outputted from the speed control part. The control device includes a circuit in which an acceleration is obtained based on an output signal of a state sensor attached to at least one of a machine structure and an axis feed mechanism and signal in which the obtained acceleration is multiplied by a predetermined gain is subtracted from the torque command outputted from the speed control part. The control device includes at least one of circuits consisting of a circuit in which a speed is obtained based on the output signal of the state sensor and a signal in which the obtained speed is multiplied by a predetermined gain is added to the speed command outputted from the position control part and a circuit in which a position is obtained based on the output signal of the state sensor and a signal in which the obtained position is multiplied by a predetermined gain is added to the position command inputted into the position control part.

A second numerical control machine tool of the present invention includes a control device, in which a cascade connection in which a speed feedback loop including a speed control part into which a speed command is inputted is provided inside a position feedback loop including a position control part into which a position command is inputted is formed, and which controls a servo motor for driving a feed axis in accordance with a torque command outputted from the speed control part. The control device includes a circuit in which an acceleration is obtained based on an output signal of a state sensor attached to at least one of a machine structure and an axis feed mechanism and an acceleration feedback signal in which the obtained acceleration is multiplied by a predetermined gain is subtracted from the torque command outputted from the speed control part. The control device includes at least one of circuits consisting of a circuit in which a speed is obtained based on the output signal of the state sensor and a signal in which the obtained speed is multiplied by a predetermined gain is added to the acceleration feedback signal and a circuit in which a position is obtained based on the output signal of the state sensor and a signal in which the obtained position is multiplied by a predetermined gain is added to the acceleration feedback signal.

Preferably, in the invention as described above, a table to which a workpiece is fixed, a tool support member which supports a tool, and a movement device which moves the table and the tool support member are provided, and the state sensor includes an acceleration detector disposed at the table and an acceleration detector disposed at the tool support member.

According to the present invention, a feed axis control method of a machine tool and a numerical control machine tool which restrain a vibration at a machine point can be provided.

BRIEF DESCRIPTION OF THE DRAWINGS

FIG. 5 is a graph illustrating a speed command and an acceleration detection value when the controls are performed by the control device of the reference example according to the first embodiment.

FIG. 6 is a graph illustrating the speed command and the acceleration detection value when the controls are performed by the first control device according to the first embodiment.

DETAILED DESCRIPTION OF THE INVENTION

A feed axis control method of a machine tool and a numerical control machine tool according to a first embodiment will be described with reference to FIG. 1 to FIG. 7. As the machine tool, a horizontal machining center in which a spindle extends in a horizontal direction will be described as an example.

Figure 1:
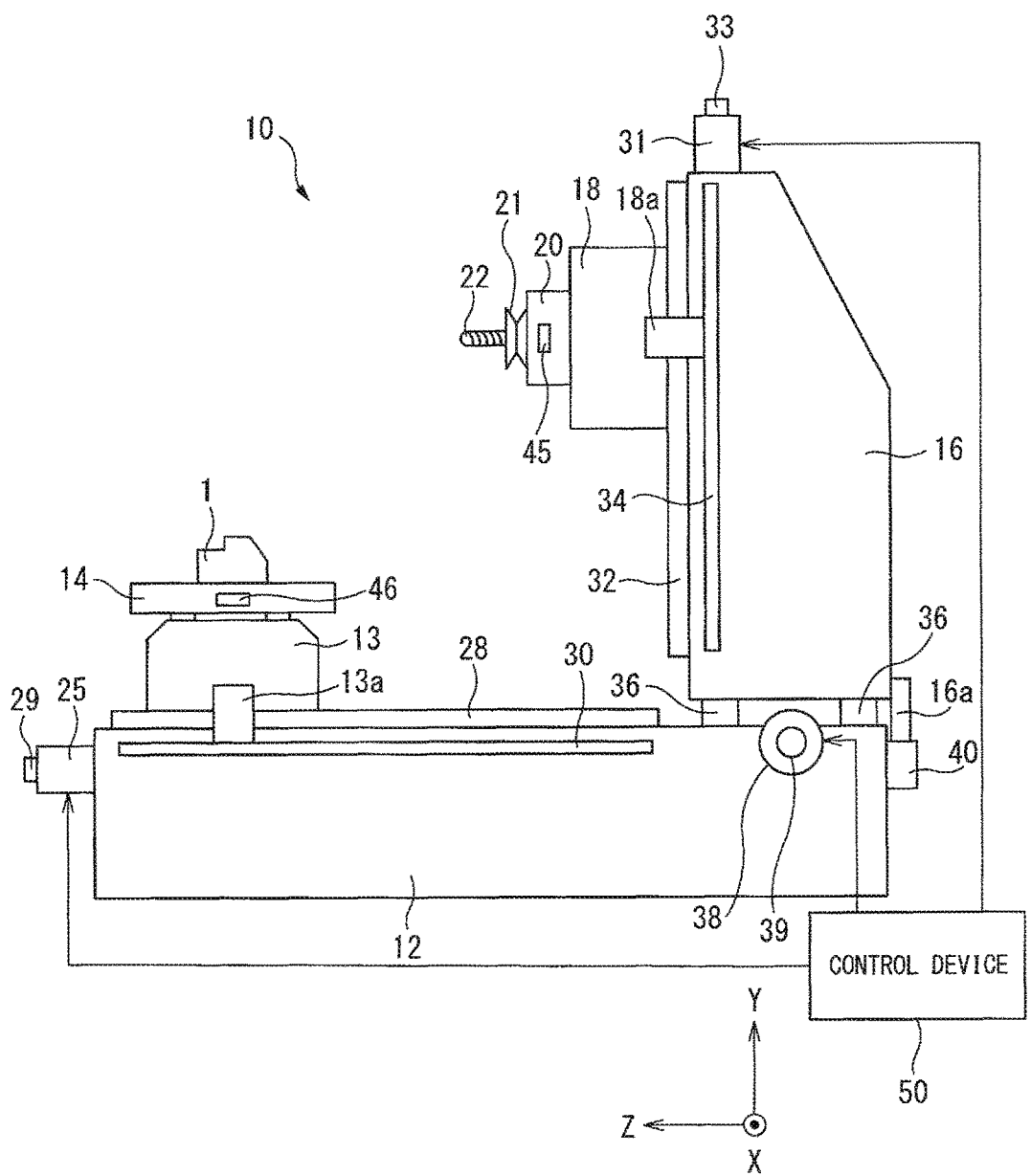
FIG. 1 is a schematic side view of a numerical control machine tool.

FIG. 1 is a schematic side view of a numerical control machine tool according to the present embodiment. A machine tool 10 includes a movement device which relatively moves a tool 22 and a workpiece 1. The movement device moves a driven element in a direction of a plurality of movement axes. The plurality of movement axes include an X-axis, Y-axis, and a Z-axis as linear feed axes which are orthogonal to each other.

The machine tool 10 includes a bed 12 disposed on a floor surface of a factory and the like. A Z-axis guide rail 28 is fixed to an upper surface of the bed 12. The Z-axis guide rail 28 extends in a Z-axis direction (left-right direction in FIG. 1). A table base 13 is disposed on an upper surface of the Z-axis guide rail 28. The table base 13 is guided by the Z-axis guide rail 28 and disposed in a manner movable in the Z-axis direction. A table 14 is fixed to the table base 13. The workpiece 1 is fixed to the table 14.

An X-axis guide rail 36 is fixed on the upper surface of the bed 12. The X-axis is orthogonal to the Z-axis and further extends in a horizontal direction (a direction vertical to the page). The X-axis guide rail 36 extends along the X-axis. A column 16 is guided by the X-axis guide rail 36 and disposed in a manner movable in an X-axis direction.

In the column 16, a Y-axis guide rail 32 is fixed on a front surface opposed to the workpiece 1. The Y-axis extends in a direction orthogonal to the X-axis and the Z-axis. The Y-axis guide rail 32 extends along the Y-axis. A spindle head 18 is disposed on the Y-axis guide rail 32. The spindle head 18 is guided by the Y-axis guide rail 32 and formed in a manner movable in a Y-axis direction. The spindle head 18 supports a spindle 20.

The movement device includes a Z-axis movement device which relatively moves the tool 22 relative to the workpiece 1 in the Z-axis direction. In the interior of the bed 12, a ball screw mechanism including a Z-axis feed screw and a nut is disposed. The nut is fixed to a lower surface of the table base 13. The nut is engaged with the Z-axis feed screw. A Z-axis servo motor 25 is connected to an end portion of the Z-axis feed screw on one hand. The table base 13 moves along the Z-axis guide rail 28 by driving the Z-axis servo motor 25. As a result, the workpiece 1 moves in the Z-axis direction.

The movement device includes an X-axis movement device which relatively moves the tool 22 relative to the workpiece 1 in the X-axis direction. Similarly to the Z-axis movement device, the X-axis movement device includes a ball screw mechanism including an X-axis feed screw and a nut. An X-axis servo motor 38 is connected to an end portion of the X-axis feed screw on one hand. The nut which is engaged with the X-axis feed screw is fixed to a lower surface of the column 16. By driving the X-axis servo motor 38, the column 16 moves along the X-axis guide rail 36. As a result, the tool 22 moves in the X-axis direction.

The movement device includes a Y-axis movement device which relatively moves the tool 22 relative to the workpiece 1 in the Y-axis direction. Similarly to the Z-axis movement device, the Y-axis movement device includes a ball screw mechanism including a Y-axis feed screw and a nut. The nut which is engaged with the Y-axis feed screw is fixed to the spindle head 18. A Y-axis servo motor 31 is connected to an upper end of the Y-axis feed screw. By driving the Y-axis servo motor 31, the spindle head 18 moves along the Y-axis guide rail 32. As a result, the tool 22 moves in the Y-axis direction.

The tool 22 is mounted through a tool holder 21 on a tip end of the spindle 20. The spindle 20 functions as a tool support member which supports the tool 22. In the spindle 20, a motor for rotating the tool 22 is housed. This motor drives so that the tool 22 rotates about a center axis of the spindle 20 as a rotation axis.

Thus, in the machine tool 10, the column 16, the spindle head 18, and the table base 13 are moved along the movement axes, whereby the tool 22 can be relatively moved relative to the workpiece 1. Note that the machine tool may include a rotation feed axis which rotates around a predetermined axial line in addition to the linear feed axes.

The machine tool 10 includes speed detectors for each axis. A speed detector 29 which detects a rotation speed of the Z-axis servo motor 25 is attached to the Z-axis servo motor 25. The speed detector 29 includes, for example, a rotary encoder, and can detect a speed based on an output of the rotary encoder. Further, a speed detector 33 is attached to the Y-axis servo motor 31. A speed detector 39 is attached to the X-axis servo motor 38. The speed detectors 29, 33, 39 for each axis are disposed, whereby a movement speed in an each axis direction can be detected.

The machine tool 10 includes position detectors for each axis. A Z-axis position detector includes a slider 13a attached to the table base 13 and a Z-axis linear scale 30 attached to the bed 12. The slider 13a moves on the Z-axis linear scale 30, whereby a position in the Z-axis direction can be detected. Further, a Y-axis position detector includes a slider 18a attached to the spindle head 18 and a Y-axis linear scale 34 attached to the column 16. The slider 18a moves on the Y-axis linear scale 34, whereby a position in the Y-axis direction can be detected. Further, an X-axis position detector includes a slider 16a attached to the column 16 and an X-axis linear scale 40 attached to the bed 12. The slider 16a moves on the X-axis linear scale 40, whereby a position in the X-axis direction can be detected.

Further, an acceleration detector 45 is disposed at the spindle 20 which supports the tool 22. The acceleration detector 45 is preferably disposed adjacent to a machine point of the tool 22. In addition, an acceleration detector 46 is disposed at the table 14. The acceleration detector 46 is preferably disposed adjacent to a machine point of the workpiece 1. The acceleration detectors 45, 46 can detect an acceleration of each axis. In other words, the acceleration detectors 45, 46 can separately detect an acceleration in the X-axis direction, an acceleration in the Y-axis direction, and an acceleration in the Z-axis direction. Note that, when the machine tool includes the rotation feed axis, the acceleration detector is disposed at a position at which a direction of the detector does not change relative to a rotation axis when a movement device of the rotation feed axis operates.

An output signal of the speed detectors 29, 33, 39, the position detectors, and the acceleration detectors 45, 46 for each axis is inputted into a control device 50.

Figure 2:
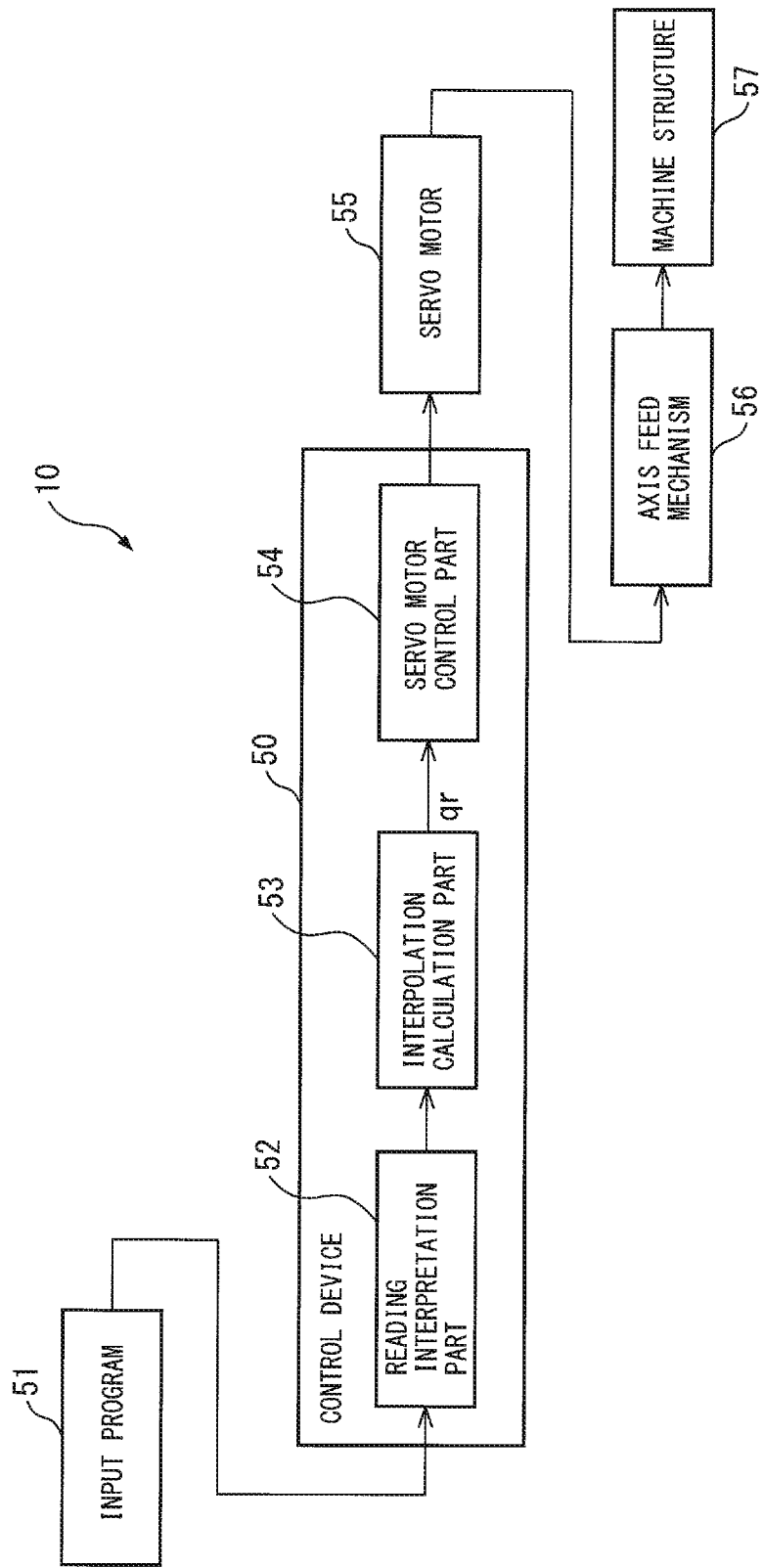
FIG. 2 is a block diagram of the machine tool.

FIG. 2 shows a block diagram of the machine tool according to the present embodiment. The machine tool 10 includes the control device 50. The control device 50 is connected to a servo motor 55 of the movement devices. The control device 50 controls the servo motor 55, whereby the tool 22 can be relatively moved with respect to the workpiece 1.

The control device 50 includes a reading interpretation part 52, an interpolation calculation part 53, and a servo motor control part 54. The reading interpretation part 52 reads an input program 51 and transmits a movement command to the interpolation calculation part 53. The interpolation calculation part 53, for example, outputs a position command qr at intervals of a predetermined time based on the movement command. The servo motor control part 54 drives the servo motor 55 of each axis based on the position command qr. In the present embodiment, the servo motor 55 of each axis corresponds to the X-axis servo motor 38, the Y-axis servo motor 31, or the Z-axis servo motor 25.

The servo motor 55 of each axis drives a machine structure 57 through an axis feed mechanism 56. The machine structure 57 corresponds to a structure which holds the tool 22 or a structure which holds the workpiece 1. In the present embodiment, the machine structure 57 corresponds to the spindle 20 or the table 14. In addition, the axis feed mechanism 56 corresponds to a mechanism which drives the machine structure 57. In the present embodiment, the axis feed mechanism 56 corresponds to the ball screw mechanism connected to the servo motor 55 of each axis. As the axis feed mechanism 56, in addition to the ball screw mechanism, a reduction gear attached to the servo motor, and the like, can be illustrated.

Figure 3:
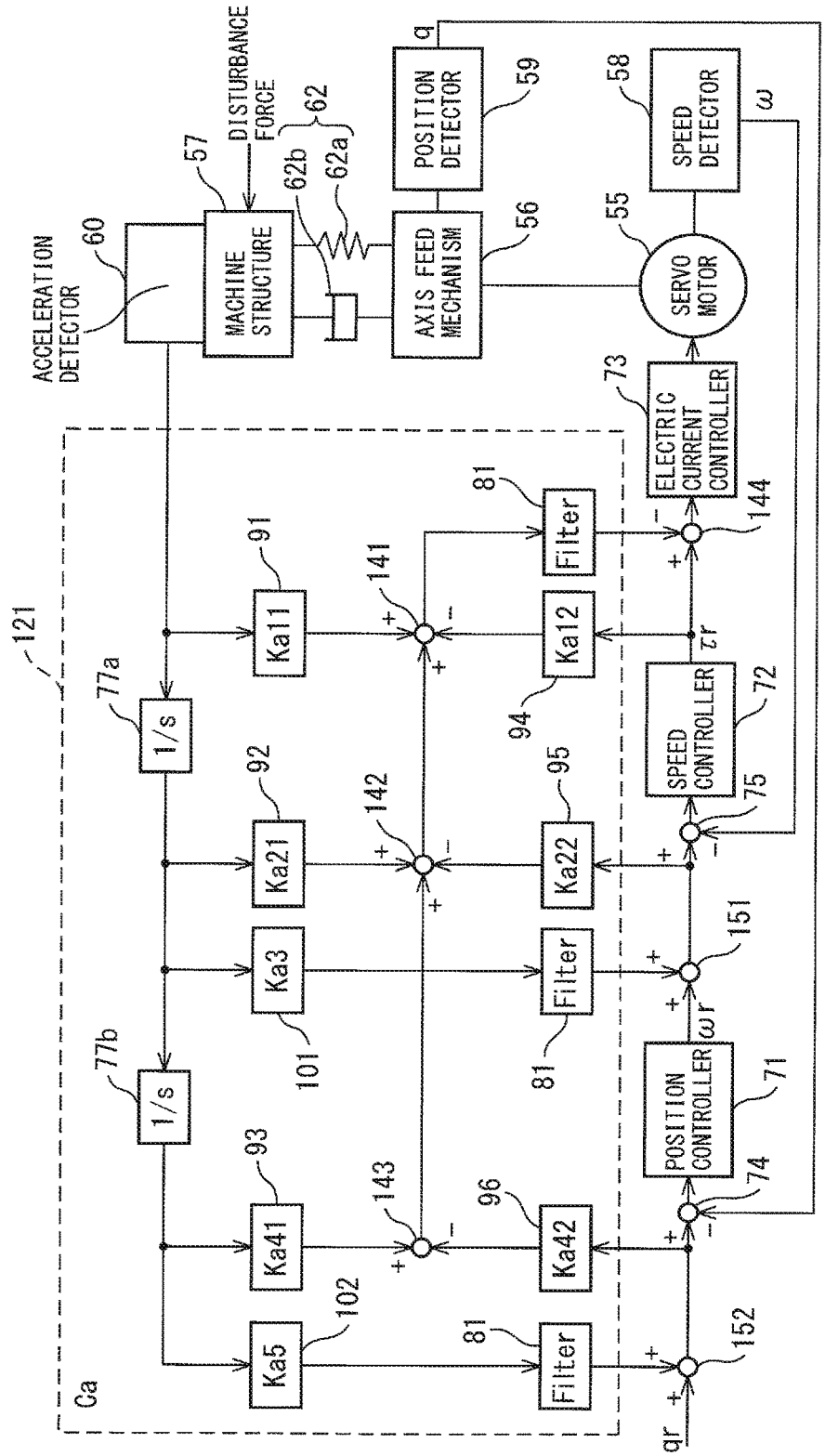
FIG. 3 is a block diagram of a first control device and a drive mechanism of a machine structure according to a first embodiment.

FIG. 3 is a block diagram of the servo motor control part of a first control device and a drive mechanism of the machine structure according to the present embodiment. A control circuit as illustrated in FIG. 3 can be formed for each of the movement axes. For example, the single control circuit as illustrated in FIG. 3 can be formed in the X-axis movement device in order to drive the X-axis servo motor 38. In this case, the servo motor 55 corresponds to the X-axis servo motor 38. A speed detector 58 corresponds to the speed detector 39 attached to the X-axis servo motor 38. A position detector 59 corresponds to the X-axis position detector including the slider 16a and the X-axis linear scale 40. An acceleration detector 60 corresponds to the acceleration detector 45 attached to the spindle 20 which holds the tool 22. In the present embodiment, the acceleration detector 45 is used as a state sensor. The state sensor is a sensor which detects a state of a predetermined structure, i.e. an acceleration, a speed, a position, or the like of a predetermined structure irrespective of a feed axis command.

The position command qr outputted from the interpolation calculation part 53 is inputted into a position controller 71 serving as a position control part. The position controller 71 generates a speed command ωr based on the position command qr. The speed command ωr outputted from the position controller 71 is inputted into a speed controller 72 serving as a speed control part. The speed controller 72 generates a torque command τr based on the speed command ωr. The torque command τr is inputted into an electric current controller 73. The electric current controller 73 controls an electric current of the servo motor 55 so as to generate a torque corresponding to the torque command τr inputted.

The drive mechanism which drives the machine structure 57 includes the axis feed mechanism 56. The axis feed mechanism 56 supports the machine structure 57. In an example as illustrated in FIG. 3, an elastic element 62 is interposed between the axis feed mechanism 56 and the machine structure 57. The elastic element 62 is a model illustrating that a portion having a low rigidity and serving as a free end vibrates. The elastic element 62 illustrates that a rigidity between the axis feed mechanism 56 and the machine structure 57 is low and the machine structure 57 vibrates relative to the axis feed mechanism 56. Meanwhile, connection of the servo motor 55 and the axis feed mechanism 56 is made with a high rigidity.

The elastic element 62 includes an elastic body 62a and a damping body 62b. The elastic body 62a is a model which determines a period, an amplitude, and the like of a vibration of the machine structure. The damping body 62b is a model which damps a vibration. The drive mechanism includes the elastic element 62 so that the machine structure 57 vibrates. Further, a position, a speed, or an acceleration of the machine structure 57 is retarded relative to an output of the servo motor 55 and a deflection is generated.

The position detector 59 attached to the axis feed mechanism 56 detects a position of a predetermined axis and feeds back a position signal q to an adder 74. The adder 74 subtracts the position signal q from the position command qr and performs transmission to the position controller 71. The position controller 71 multiplies the inputted signal by a gain Cp to calculate the speed command ωr. The gain Cp is a function of a Laplacian s. In the present embodiment, a circuit which corrects the position command qr will be referred to as position feedback loop.

The speed detector 58 attached to the servo motor 55 detects a speed at a predetermined axis. The speed detector 58 feeds back a speed signal ω to the adder 75. The adder 75 subtracts the speed signal ω from the speed command ωr and performs transmission to the speed controller 72. The speed controller 72 multiplies the inputted signal by a gain Cv to calculate the torque command τr. The gain Cv is a function of the Laplacian s. In the present embodiment, a circuit which corrects the speed command ωr will be referred to as speed feedback loop.

Thus, the speed feedback loop including the speed control part into which the speed command ωr is provided inside the position feedback loop including the position control part into which the position command qr is inputted so as to form a cascade connection. In this control, a position and a speed at present corresponding to the output from the servo motor 55 are detected so that a retard relative to the feed axis command can be corrected. This control is also referred to as servo control. Note that a gain of each compensator included in the control circuit is determined in advance and an optimal value is preferably adopted.

Figure 4:
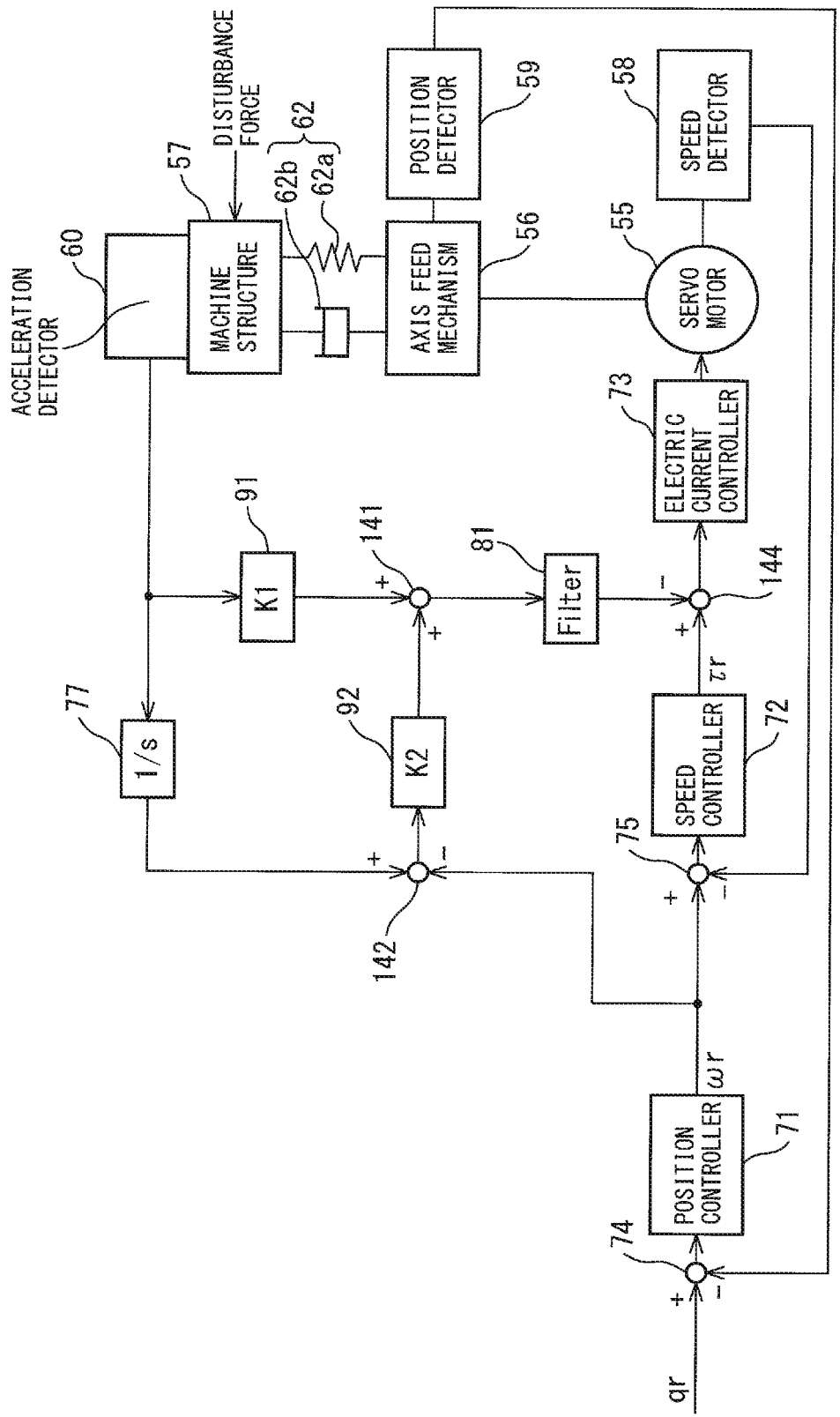
FIG. 4 is a block diagram of a control device and the drive mechanism of the machine structure of a reference example according to the first embodiment.

A control device of a reference example according to the present embodiment will be described. FIG. 4 is a block diagram of a servo motor control part of the reference example and the drive mechanism of the machine structure according to the present embodiment. Also in the reference example as illustrated in FIG. 4, the elastic element 62 is interposed between the axis feed mechanism 56 and the machine structure 57. From the acceleration detector 60 attached to the machine structure 57, an acceleration signal is outputted. The acceleration signal is multiplied by a gain K1 in a compensator 91 and outputted to an adder 141.

Meanwhile, the acceleration signal outputted from the acceleration detector 60 is integrated by an integrator 77 to be converted into a speed signal. Then, in an adder 142, the speed command outputted by the position controller 71 is subtracted from the speed signal outputted from the integrator 77. In the adder 142, a speed deflection between a speed of the machine structure 57 and the speed command ωr can be calculated. An output signal of the adder 142 is inputted into a compensator 92. In the compensator 92, multiplying by a gain K2 is performed. An output of the compensator 92 is inputted into the adder 141.

In the adder 141, an output signal of the compensator 91 and an output signal of the compensator 92 are added. An output signal of the adder 141 is inputted through a filter 81 into an adder 144. In the adder 144, the output signal of the adder 141 is subtracted from the torque command τr outputted from the speed controller 72.

A circuit passing through the compensator 91 is a circuit in which an acceleration of the machine structure 57 is fed back. A circuit passing through the compensator 92 is a circuit in which a speed of the machine structure is fed back. The circuits make a vibration of the machine structure 57 to be restrained. In particular, by changing values of the gain K1 and the gain K2, a phase of a speed feedback relative to a phase of an acceleration feedback is adjusted so that a vibration of the machine structure 57 can be restrained.

However, the elastic element 62 is interposed between the machine structure 57 at which the acceleration detector 60 is disposed and the servo motor 55. When the torque command τr outputted from the speed controller 72 is corrected by an acceleration feedback signal, there has been a case in which a deflection of the position command qr or the speed command ωr is generated. In particular, when an acceleration of the machine structure 57 changes, a deflection of the position command qr or the speed command ωr becomes large, and the servo control is performed through the position feedback loop and the speed feedback loop, so that there has been a case in which the acceleration feedback signal which restrains a vibration of the machine structure is cancelled by the servo control.

In the control device according to the present embodiment, an acceleration of the machine structure and the like are detected irrespective of each axis command so as to be reflected upon the each axis command, and a stabilization control for stabilizing a drive of the machine structure is performed. With reference to FIG. 3, the control device according to the present embodiment includes a stabilization compensation circuit 121 for machine structure. The stabilization compensation circuit 121 for machine structure restrains a vibration of the machine structure 57. A signal outputted from the acceleration detector 60 is inputted into the stabilization compensation circuit 121 for machine structure.

The acceleration signal detected by the acceleration detector 60 is inputted into the compensator 91. In the compensator 91, multiplying by a gain K11 as a first gain is performed. An output signal of the compensator 91 is inputted into the adder 144, passing through the adder 141 and the filter 81. This circuit is an acceleration feedback circuit. In other words, the torque command τr outputted from the speed controller 72 is corrected by feeding back an acceleration of the machine structure 57.

The acceleration signal detected by the acceleration detector 60 is converted by an integrator 77a into a speed signal. The speed signal is inputted into a compensator 101. In the compensator 101, multiplying by a gain Ka3 is performed. An output signal of the compensator 101 is inputted into an adder 151 through the filter 81. In the adder 151, the output signal of the compensator 101 is added to the speed command ωr outputted from the position controller 71. Note that the gain Ka3 according to the present embodiment is set to be a negative gain.

Such a control circuit can cancel a speed deflection generated due to a circuit which includes the compensator 91 and in which an acceleration is fed back. The speed command τr in which a speed deflection has been cancelled can be transmitted to the speed controller 72. In other words, a signal in which a speed deflection has been cancelled can be set as a control target.

Accordingly, a vibration of the machine structure 57 can be restrained.

Further, the speed signal outputted from the integrator 77a is integrated by an integrator 77b. A position signal is outputted from the integrator 77b. The position signal is inputted into a compensator 102. In the compensator 102, multiplying by a gain Ka5 is performed. An output signal of the compensator 102 is inputted into an adder 152 through the filter 81. In the adder 152, the output signal of the compensator 102 is added to the position command qr. Note that the gain Ka5 according to the present embodiment is set to be a negative gain.

Such a control circuit can cancel a position deflection generated due to a circuit which includes the compensator 91 and in which an acceleration is fed back. The position command qr in which a position deflection has been cancelled can be transmitted to the position controller 71. In other words, a signal in which a position deflection has been cancelled can be set as a control target. Accordingly, a vibration of the machine structure 57 can be restrained.

In the present embodiment, both a circuit which includes the compensator 101 and in which a speed deflection is cancelled and a circuit which includes the compensator 102 and in which a position deflection is cancelled are disposed, but this configuration is not limitative, and disposing one of the circuits can restrain a vibration of the machine structure 57.

As the feed axis control method according to the present embodiment, at least one control among the control in which a speed is obtained based on an output signal of the acceleration detector 60 and a signal in which the obtained speed is multiplied by the predetermined gain Ka3 is added to the speed command outputted from the position controller 71 and the control in which a position is obtained based on the output signal of the acceleration detector 60 and a signal in which the obtained position is multiplied by the predetermined gain Ka5 is added to the position instruction qr to be inputted into the position controller 71 is performed. By adopting this method, a vibration of the machine structure 57 can be restrained.

In addition, the first control device according to the present embodiment corrects the torque command τr based on, in addition to the acceleration feedback signal, a feedback signal of a speed of the machine structure 57 and a feedback signal of a position of the machine structure 57. A speed signal outputted from the integrator 77a is inputted into the compensator 92. In the compensator 92, multiplying by a gain Ka21 as a second gain is performed. An output signal of the compensator 92 is inputted into the adder 141 through the adder 142. Further, a position signal outputted from the integrator 77b is inputted into the compensator 93. In the compensator 93, multiplying by a gain Ka41 as a fourth gain is performed. An output signal of the compensator 93 is inputted through the adders 143, 142 into the adder 141.

In the adder 141, the acceleration feedback signal outputted from the compensator 91, the speed feedback signal outputted from the compensator 92, and the position feedback signal outputted from the compensator 93 are added. Then, this feedback signal is inputted into the adder 144 through the filter 81. In the adder 144, this feedback signal is subtracted from the torque command τr.

In the control device according to the present embodiment, the speed feedback signal and the position feedback signal are added to the acceleration feedback signal. In circuits of the respective feedback signals, the gain Ka11 of the compensator 91, the gain Ka21 of the compensator 92, and the gain Ka41 of the compensator 93 can be independently set. Accordingly, an influence by an acceleration can be adjusted by the gain Ka11, an influence by a speed can be adjusted by the gain Ka21, and further, an influence by a position can be adjusted by the gain Ka41. A value of the gains Ka11, Ka21, Ka41 is set to be a appropriate value, whereby a vibration of the machine structure 57 can be effectively restrained. Further, the value of the gains Ka11, Ka21, Ka41 is adjusted, whereby, without the elastic element 62, a control when the machine structure 57 is supported by the axis feed mechanism 56 with a rigid structure can be also performed.

Further, in the circuit in which an acceleration is fed back, the torque command τr outputted from the speed controller 72 is inputted into a compensator 94. In the compensator 94, multiplying by a gain Ka12 as a sixth gain is performed. The gain Ka11 and the gain Ka12 can adopt, for example, the same value. An output signal of the compensator 94 is inputted into the adder 141. In the adder 141, the output signal of the compensator 94 is subtracted from the output signal of the compensator 91. Thus, in the acceleration feedback circuit, the compensator 94 is disposed and a deflection between the acceleration feedback signal and the torque command τr is calculated.

In the circuit in which a speed is fed back, the speed command ωr outputted from the position controller 71 is inputted into a compensator 95. In the compensator 95, multiplying by a gain Ka22 as a third gain is performed. The gain Ka21 and the gain Ka22 can adopt, for example, the same value. In the adder 142, an output signal of the compensator 95 is subtracted from the output signal of the compensator 92. Thus, in the speed feedback circuit, the compensator 95 is disposed and a deflection between the speed feedback signal and the speed command ωr is calculated, and the deflection is inputted into the adder 141.

In the circuit in which a position is fed back, the position command qr is inputted into a compensator 96. In the compensator 96, multiplying by a gain Ka42 as a fifth gain is performed. The gain Ka41 and the gain Ka42 can adopt, for example, the same value. In the adder 143, an output signal of the compensator 96 is subtracted from the output signal of the compensator 93. Thus, in the position feedback circuit, a deflection between the position feedback signal and the position command qr is calculated, and the deflection is inputted into the adder 141 through the adder 142.

The signal obtained from the acceleration detector 60 includes a component and the like indicating an acceleration serving as an original target value and a vibration component due to a vibration of the machine structure 57. In each feedback circuit, a command value is subtracted from a value based on a detection value, whereby the component indicating an acceleration and the like serving as an original target value can be subtracted. In other words, only the vibration component can be extracted. Then, the torque command τr is corrected based on a signal in which the vibration component with respect to an acceleration, the vibration component with respect to a speed, and the vibration component with respect to a position are added. In a circuit in which a state of the machine structure is fed back, only the vibration component extracted can be fed back. Consequently, a high vibration-restraining effect can be exhibited.

In the present embodiment, both the circuit including the compensator 92 in which a speed is fed back and the circuit including the compensator 93 in which a position is fed back are disposed, but this configuration is not limitative, and one of the circuits may be disposed. In addition, in each feedback circuit, circuits including the compensators 94, 95, 96 in which a deflection is calculated may not be disposed.

In particular, the stabilization compensation circuit 121 for machine structure can be configured by two compensators which are the compensator 91 and the compensator 94, the adder 141, and the filter 81. Also in this case, in the acceleration feedback circuit, a deflection between the acceleration feedback signal and the torque command τr is calculated in the adder 141, and the vibration component of the acceleration can be transmitted to the adder 144 so that a vibration of the machine structure 57 can be restrained.

The filter 81 preferably damps a signal other than a signal in a desired frequency band. For example, the filter 81 is preferably a filter which allows a signal in a band of a resonance frequency of the machine tool 10 to pass. The resonance frequency of the machine tool 10 depends on a structure of the machine tool 10 and the like. As the filter 81, a desired filter such as a high pass filter, a low pass filter, a notch filter, and a band pass filter can be used. Alternatively, a signal in a desired frequency band is allowed to pass by combining the filters.

Next, a method for setting the gain K1 of the compensator 91 and the gain K2 of the compensator 92 will be described with reference to FIG. 4. The gain K1 corresponds to the first gain and the gain K2 corresponds to the second gain. The speed signal outputted from the integrator 77 has a phase difference relative to the acceleration signal. The gain K1 and the gain K2 are changed, whereby a phase of the speed feedback signal relative to the acceleration feedback signal can be changed.

When a circuit of the compensator 92 is absent, i.e. when the gain K2 is zero, the gain K1 is increased, whereby an effect of the acceleration feedback can be increased. However, when the gain K1 is increased too largely, an oscillation occurs. Then, the gain K1 which is large to such an extent that an oscillation does not occur can be selected. In the gain K1, an effect of the acceleration feedback can be increased while an oscillation is suppressed. The maximum gain K1 will be referred to as set value R. The set value R can be determined in advance. Subsequently, the gain K1 and the gain K2 are determined so that an output value from the adder 141 does not exceed the set value R. The gain K1 and the gain K2 can be set so as to satisfy the following equation.

$$K1^2 + K2^2 = R^2 \tag{1}$$

Then, using a virtual angle θ, the gain K1 and the gain K2 can be expressed by the following equations.

$$K1 = R \cos \theta \tag{2}$$

$$K2 = R \sin \theta \tag{3}$$

By selecting the angle θ, a phase of the speed feedback signal relative to the acceleration feedback signal can be optionally set. The angle θ can be set so that a vibration of the machine structure 57 is minimum. Alternatively, the gain K1 and the gain K2 can be set so that the relationship of equation (1) is satisfied and a vibration of the machine structure 57 is minimum. The gain K1 and the gain K2 are thus set so that an oscillation due to a set value of the gains is suppressed while a vibration of the machine structure 57 can be effectively restrained.

In the control device according to the present embodiment as illustrated in FIG. 3, similarly as described above, the gain Ka11 of the compensator 91 and the gain Ka21 of the compensator 92 can be set. In other words, the gain Ka11 and the gain Ka21 can be set so as to satisfy the following equation. Note that, as described above, the gain Ka11 corresponds to the first gain and the gain Ka21 corresponds to the second gain.

$$Ka11^2 + Ka21^2 = R^2 \tag{4}$$

Then, using the virtual angle θ, the gain Ka11 and the gain Ka21 can set as the following equations.

$$Ka11 = R \cos \theta \quad (5)$$

$$Ka12 = R \sin \theta \quad (6)$$

Next, with respect to the first control device and the control device of the reference example according to the present embodiment, a result in which a simulation of machining of the machine tool is performed will be described.

FIG. 5 is a graph of a result of a simulation of a drive by the control device of the reference example as illustrated in FIG. 4. A one-dot chain line illustrates a speed command value and a solid line illustrates a detection value of an acceleration of the machine structure. At time t0, the speed command value and the acceleration are both zero. Then, it is apparent that after the acceleration is changed, even at an interval in which a command acceleration is constant, the detection value of the acceleration vibrates. For example, at time t1, the speed command value is changed to accelerate. From time t1 to time t2, although the command acceleration is constant, the detection value of the acceleration vibrates. In addition, after the acceleration is changed at times t2, t3, t4, t5, the detection value of the acceleration vibrates. Further, although the speed command value is configured to be zero at time t6, a residual vibration is generated.

FIG. 6 shows a graph of a result of a simulation of a drive by the first control device according to the present embodiment as illustrated in FIG. 3. Note that, in the simulation, the gains of the compensators 93, 96, 102 are configured to be zero in the circuit of FIG. 3. In other words, the simulation is performed without using the circuit in which a position deflection is cancelled and the circuit in which a position is fed back. It is apparent that at an interval from time t1 to time t2, an interval from time t2 to time t3, and the like, a vibration of the detection value of the acceleration is restrained in comparison with the control device of the reference example. It is apparent that the detection value of the acceleration indicates a substantially constant value. Further, it is apparent that a residual vibration after time t6 is also restrained in comparison with the control device of the reference example. Thus, by adopting the control device according to the present embodiment, a vibration of the machine structure can be restrained.

Figure 7:
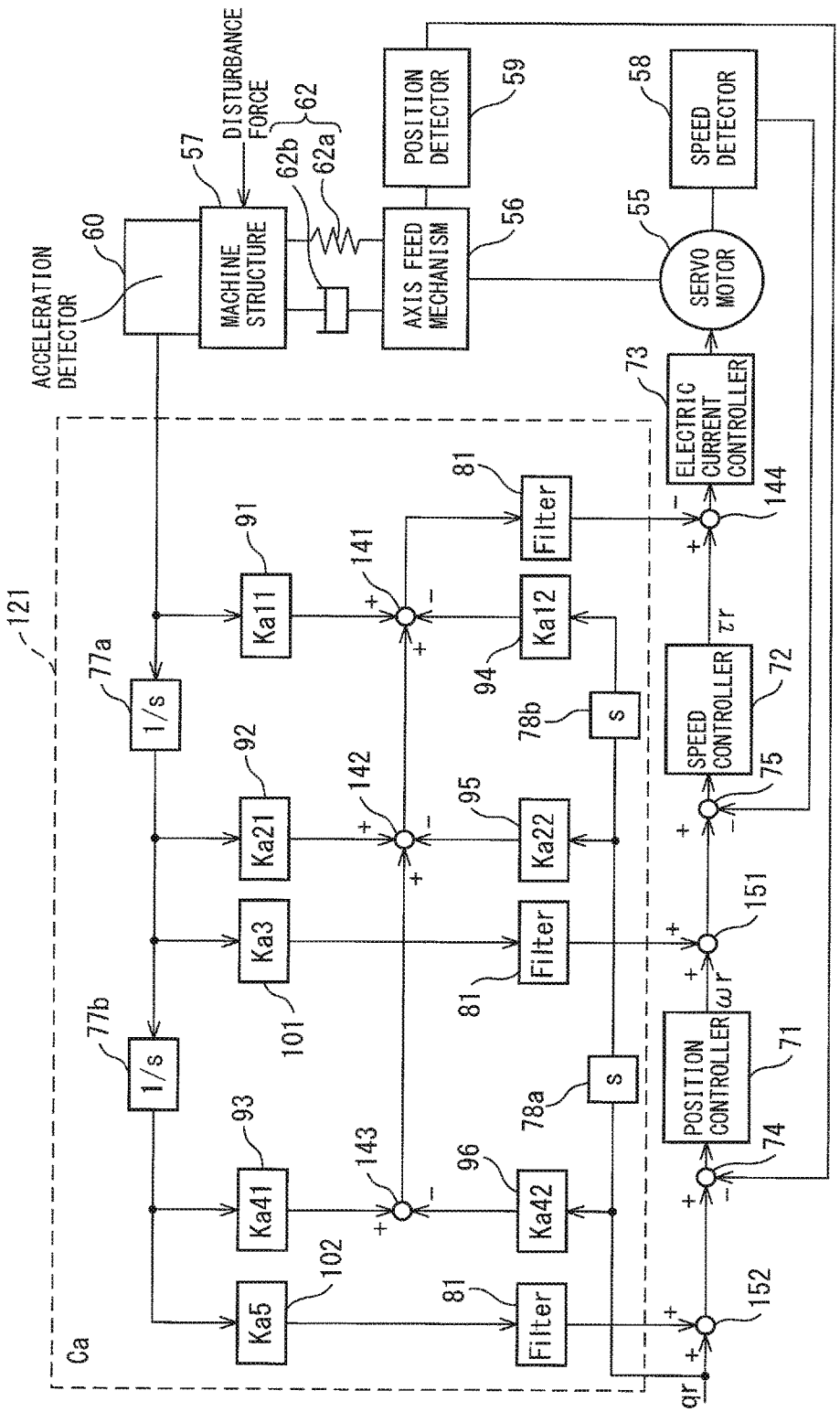
FIG. 7 is a block diagram of a second control device and the drive mechanism of the machine structure according to the first embodiment.

FIG. 7 is a block diagram illustrating a second control device and the drive mechanism of the machine structure according to the present embodiment. With reference to FIG. 3, in the first control device, the respective feed axis command is inputted into the compensators 94, 95, 96 in the acceleration feedback circuit, in the speed feedback circuit, or in the position feedback circuit. For example, the speed command ωr is inputted into the compensator 95. However, the command inputted into the compensators 94, 95, 96 is a command corrected by the other circuits. For example, the position command qr inputted into the compensator 96 is a command corrected by an output of the compensator 102 in the circuit in which a position deflection is cancelled.

With reference to FIG. 7, in the second control device, a signal based on the position command qr uncorrected is inputted into the compensators 94, 95, 96. Into the compensator 96, the position command qr outputted from the interpolation calculation part 53, i.e. the position command qr uncorrected is inputted. In other words, a signal before being corrected by the adder 152 is inputted into the compensator 96. The signal before being corrected by the adder 152 is differentiated by a differentiator 78a and inputted into the compensator 95. Further, an output signal of the differentiator 78a is differentiated by a differentiator 78b and inputted into the compensator 94.

In the second control device according to the present embodiment, since the position command qr outputted from the interpolation calculation part 53 is used, a deflection between the feedback signal of an acceleration, a speed, or a position and the feed axis command can be accurately calculated. In the adder 141, a deflection between the acceleration feedback signal and the torque command can be accurately calculated. In the adder 142, a deflection between the speed feedback signal and the speed command can be accurately calculated. In the adder 143, a deflection between the position feedback signal and the speed command can be accurately calculated. As a result, the vibration component included in the signal obtained from the output signal of the acceleration detector 60 can be accurately extracted. Consequently, an effect of restraining a vibration of the machine structure 57 can be improved. The other configurations, operations, and effects are similar to the first control device.

The machine tool 10 according to the present embodiment comprises the movement device which moves the table 14 and the movement device which moves the spindle 20 as the tool support member. Then, the acceleration detectors 45, 46 serving as the state sensor are disposed at the table 14 and the spindle 20. The acceleration detectors are respectively disposed at the two machine structures which are moved by the movement devices. Then, the present invention is applied to the servo motor control part which controls the movement device for each movement axis, whereby a vibration of the workpiece 1 fixed to the table 14 can be restrained. In addition, a vibration of the tool 22 supported by the spindle 20 can be restrained. A vibration of the driven element of both the workpiece 1 and the tool 22 can be restrained so that highly accurate machining can be performed.

The feed axis control method of the machine tool and the numerical control machine tool according to a second embodiment will be described with reference to FIG. 8 and FIG. 9. The machine tool according to the present embodiment differs in a position of the elastic element from the machine tool according to the first embodiment.

Figure 8:
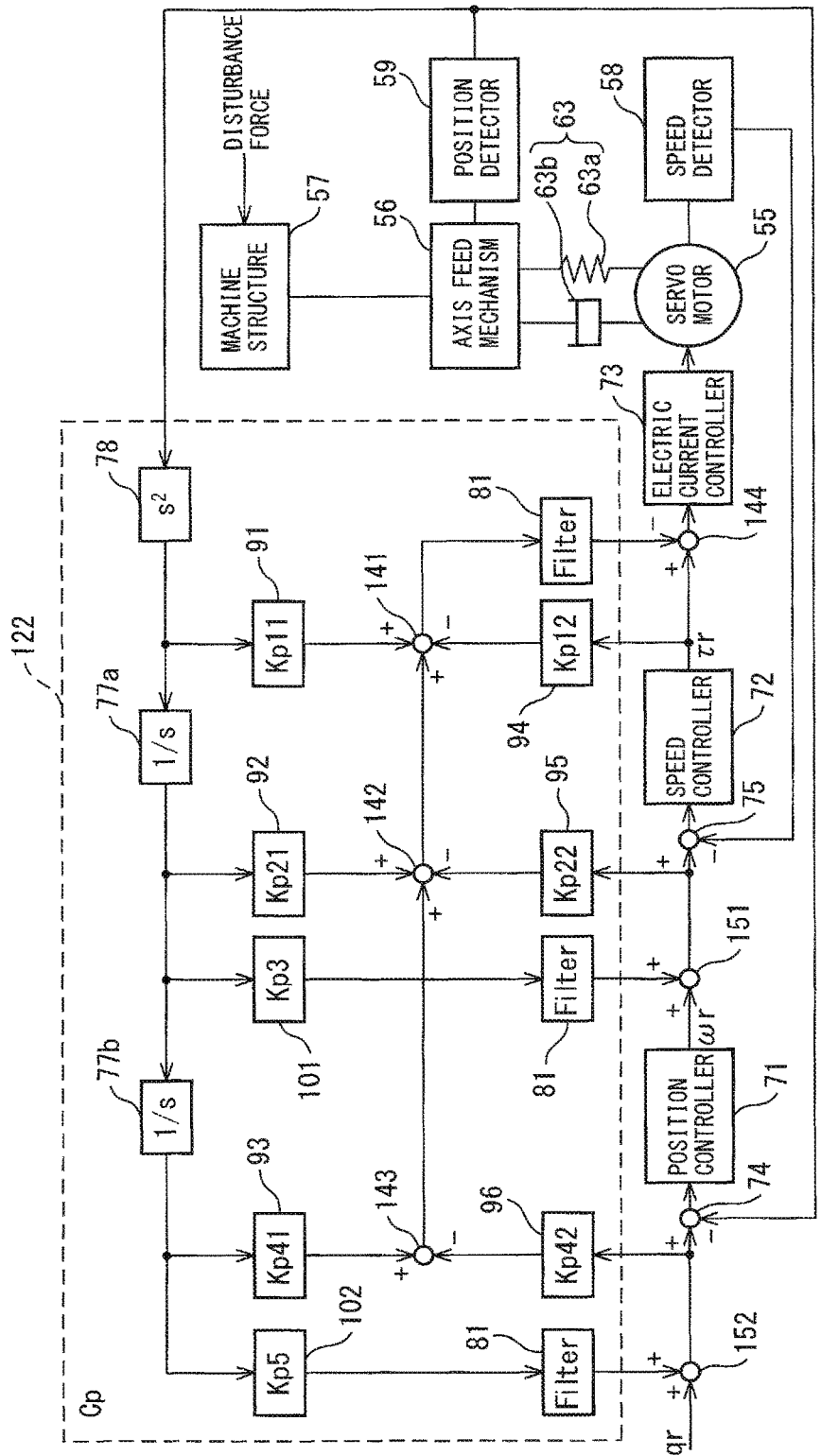
FIG. 8 is a block diagram of the first control device and the drive mechanism of the machine structure according to the second embodiment.

FIG. 8 shows a block diagram of the first control device and the drive mechanism of the machine structure according to the present embodiment. The machine tool according to the present embodiment has a structure having a high rigidity between the machine structure 57 and the axis feed mechanism 56. On the other hand, the machine tool has a structure having a low rigidity between the axis feed mechanism 56 and the servo motor 55. In a model of this machine tool, an elastic element 63 is present between the servo motor 55 and the axis feed mechanism 56. The elastic element 63 includes an elastic body 63a and a damping body 63b. When a disturbance force is applied to the machine structure 57, the machine structure 57 and the axis feed mechanism 56 integrally vibrate.

The drive mechanism of such a machine structure 57 is applied, for example, a case in which a constituting member of the ball screw mechanism of the movement device of each axis is elastically deformed. Note that, when the servo motor 55 directly drive the machine structure 57, this model is not applied. For example, when the drive mechanism is of a direct drive type in which a motor is disposed in the interior of the machine structure 57, the drive mechanism according to the present embodiment is not applied, but the drive mechanism according to the first embodiment is applied.

In the present embodiment, a stabilization control for stabilizing a drive of the axis feed mechanism is performed. The servo motor control part 54 of the control device 50 includes a stabilization compensation circuit 122 for axis feed mechanism. The position signal outputted by the position detector 59 attached to the axis feed mechanism 56 is inputted into the stabilization compensation circuit 122 for axis feed mechanism. In the present embodiment, the position detector 59 functions as the state sensor which detects a state of the axis feed mechanism 56.

The position signal of the axis feed mechanism 56 which is detected by the position detector 59 is inputted into a differentiator 78. An acceleration signal is outputted from the differentiator 78. Then, the acceleration signal is inputted into the compensator 91 and the integrator 77a. The other circuits of the stabilization compensation circuit 122 for axis feed mechanism of the first control device according to the present embodiment are similar to the stabilization compensation circuit 121 for machine structure of the first control device according to the first embodiment. The compensators 91-96, 101, 102 are similar to the compensators of the first control device according to the first embodiment (see FIG. 3). The gains Kp11, Kp21, and the like of the respective compensators are set in accordance with a control circuit according to the present embodiment.

By a circuit including the compensators 101, 102, a speed deflection and a position deflection of the feed axis command can be cancelled. In addition, a circuit in which an acceleration of the axis feed mechanism 56 is fed back is configured by a circuit including the compensator 91. A circuit in which a speed of the axis feed mechanism 56 is fed back and a circuit in which a position of the axis feed mechanism 56 is fed back are configured by a circuit including the compensators 92, 93. By the circuit including the compensators 92, 93, a speed feedback signal and a position feedback signal can be added to an acceleration feedback signal outputted from the compensator 91, and an influence by a speed and an influence by a position can be separately adjusted in addition to an influence by an acceleration. As a result, a vibration of the machine structure 57 can be easily restrained.

Figure 9:
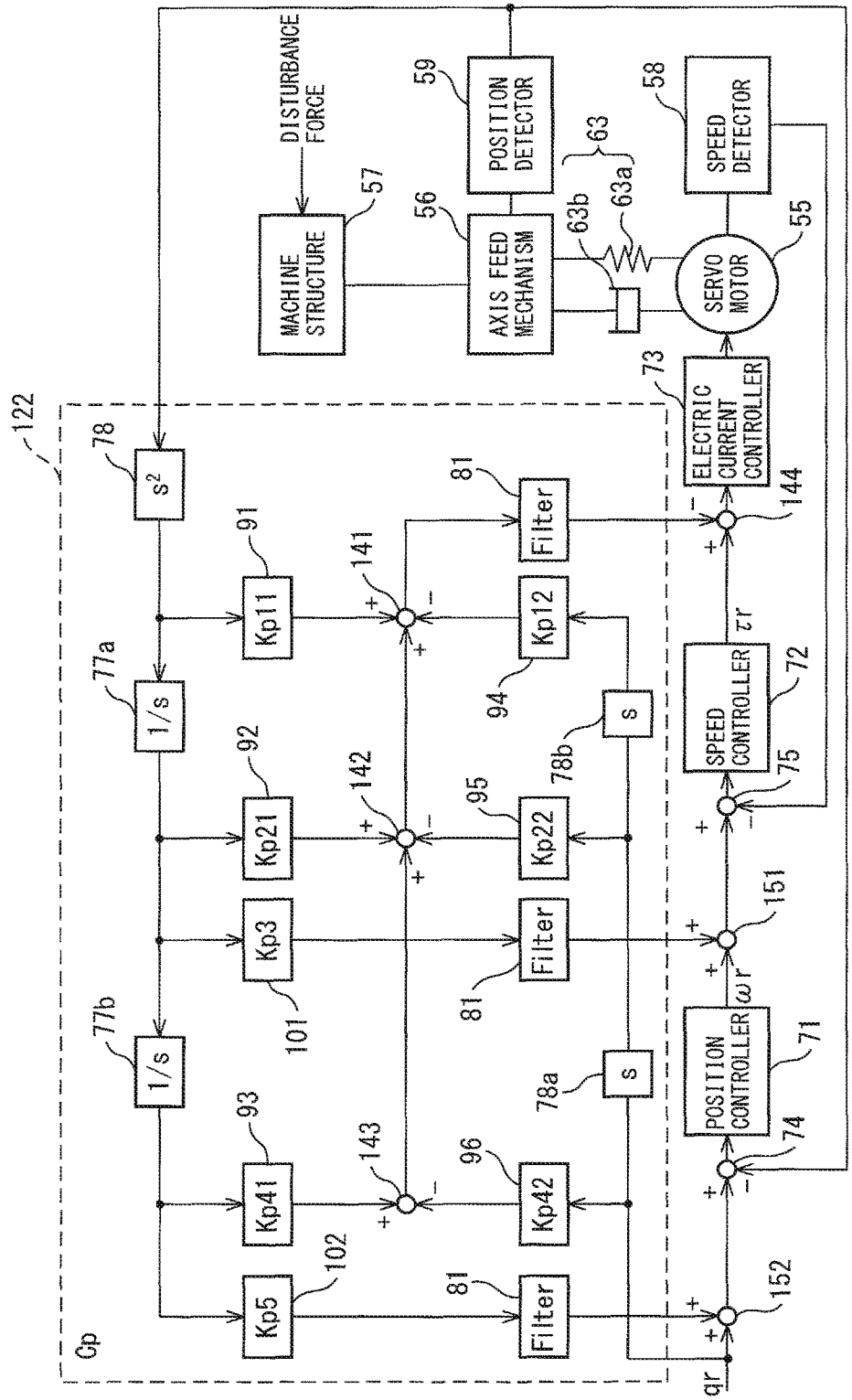
FIG. 9 is a block diagram of the second control device and the drive mechanism of the machine structure according to the second embodiment.

FIG. 9 shows a block diagram of the second control device and the drive mechanism of the machine structure according to the present embodiment. In the second control device according to the present embodiment, similarly to the second control device according to the first embodiment, a signal based on the position command qr uncorrected is inputted into the compensators 94, 95, 96. The position command qr outputted from the interpolation calculation part 53 is inputted into the compensator 96. In addition, the signal before being corrected by the adder 152 is differentiated by the differentiator 78a and inputted into the compensator 95. Further, an output signal of the differentiator 78a is differentiated by the differentiator 78b and inputted into the compensator 94. The other configurations of the control circuit are similar to the first control device according to the present embodiment.

In the second control device according to the present embodiment, a deflection between the feedback signal of an acceleration, a speed, or a position and the feed axis command can be more accurately calculated than the first control device. As a result, a vibration restraining effect is improved.

In the control device according to the present embodiment, a position detected by the position detector 59 is converted into an acceleration, and then into a speed and a position, but this configuration is not limitative, and as the speed feedback signal, an output signal of the position detector 59 may be differentiated and then multiplied by the gain Kp21. In addition, as the position feedback signal, the output signal of the position detector 59 may be multiplied by a gain Kp41.

The other configurations, operations, and effects are similar to the first embodiment, description of which will not be accordingly repeated.

Third Embodiment

The feed axis control method of the machine tool and the numerical control machine tool according to a third embodiment will be described with reference to FIG. 10 and FIG. 11. The control device according to the present embodiment performs a stabilization control for stabilizing a drive of the servo motor.

Figure 10:
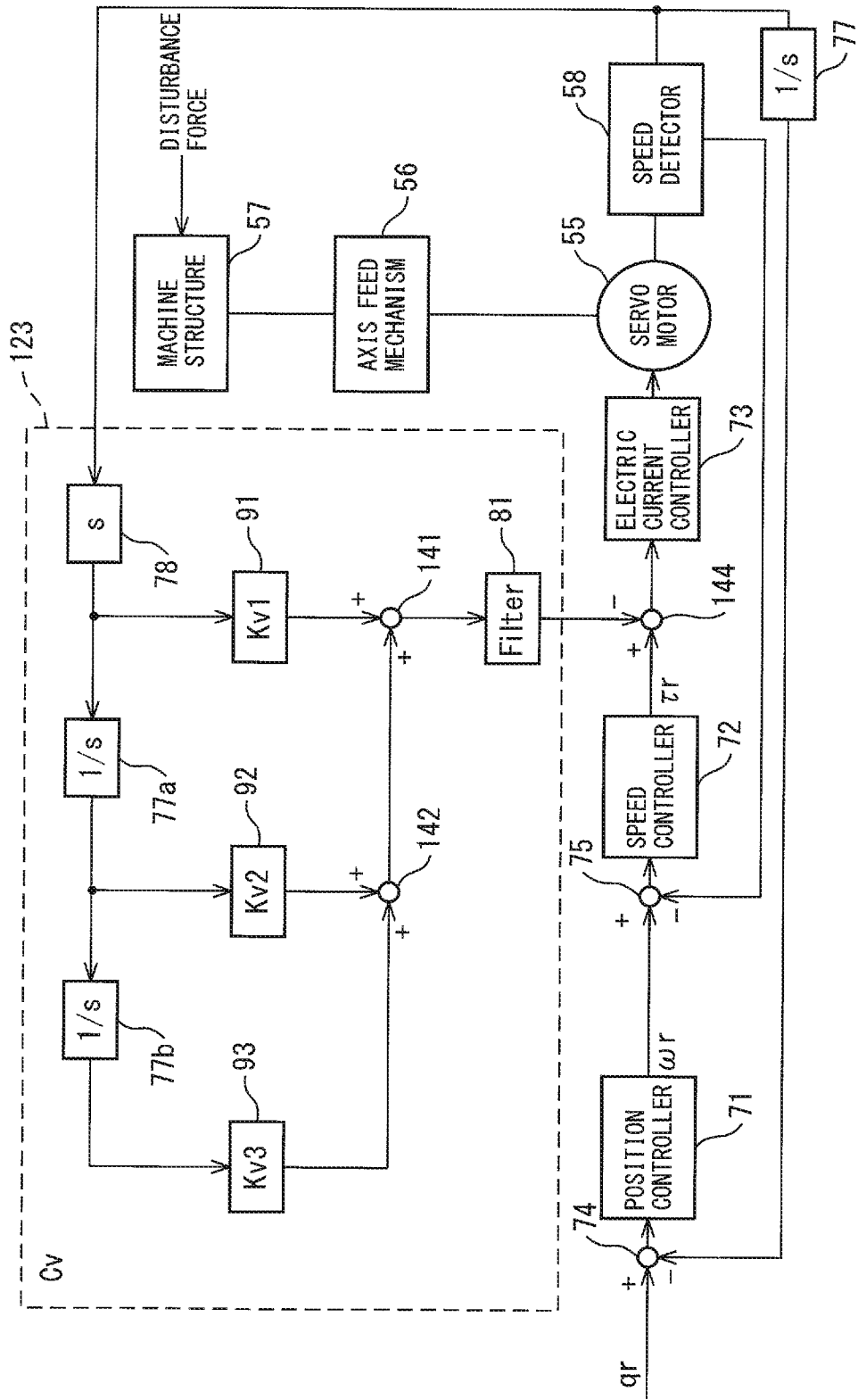
FIG. 10 is a block diagram of the first control device and the drive mechanism of the machine structure according to a third embodiment.

FIG. 10 shows a block diagram of the control device and the drive mechanism of the machine structure according to the present embodiment. The servo motor 55, the axis feed mechanism 56, and the machine structure 57 are connected to each other with a high rigidity. Similarly to the first embodiment, a speed detected by the speed detector 58 is inputted into the adder 75 and the speed feedback loop is configured. In the position feedback loop, a speed signal detected by the speed detector 58 is inputted into the integrator 77. A position signal outputted from the integrator 77 is inputted into the adder 74.

Figure 11:
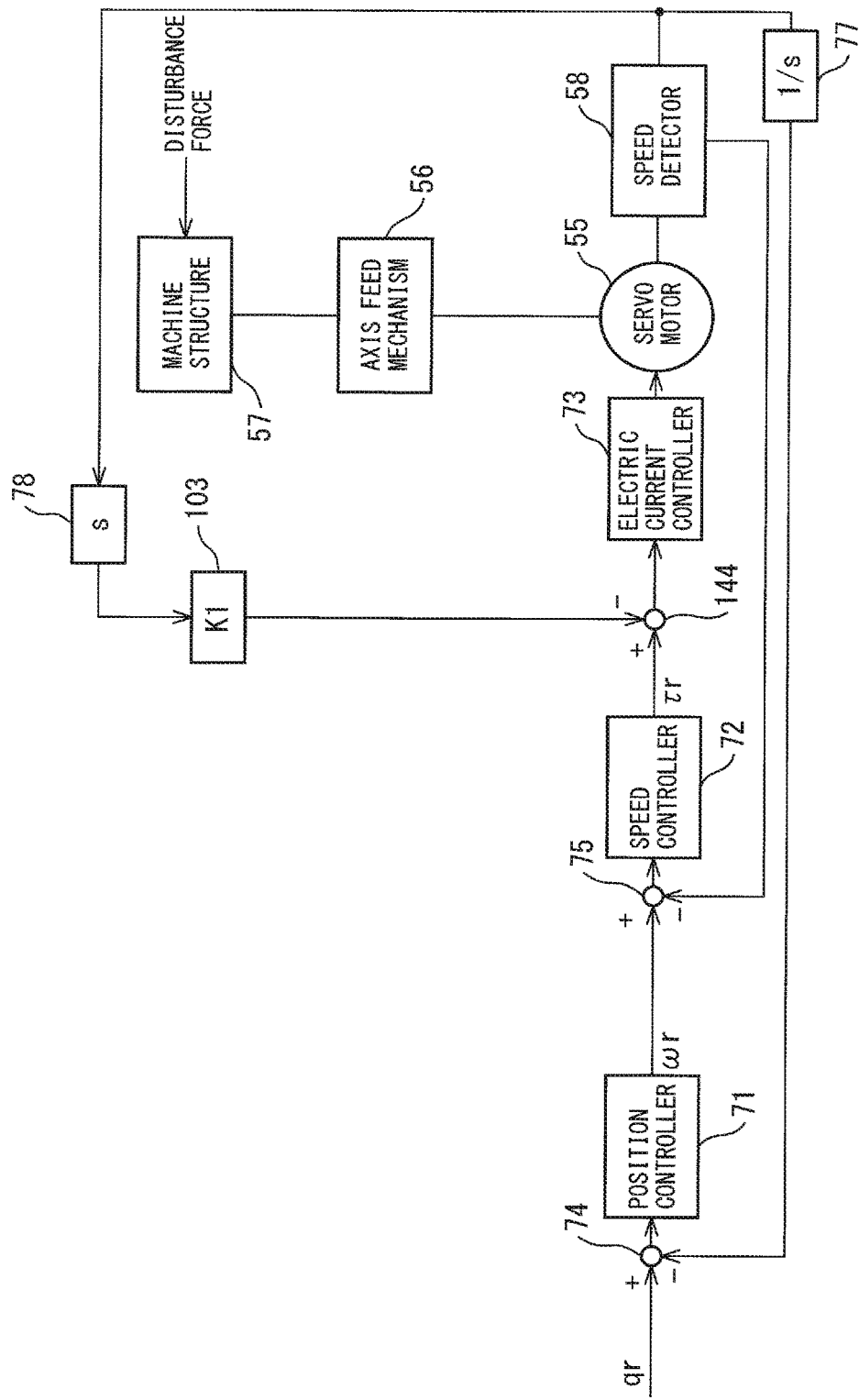
FIG. 11 is a block diagram of the control device and the drive mechanism of the machine structure of the reference example according to the third embodiment.

FIG. 11 shows a block diagram of the control device of the reference example and the drive mechanism of the machine structure according to the present embodiment. In the control device of the reference example, the speed signal outputted from the speed detector 58 is inputted into the differentiator 78. An acceleration signal outputted from the differentiator 78 is inputted into a compensator 103. In the compensator 103, multiplying by the gain K1 is performed. An output signal of the compensator 103 is inputted into the adder 144. In the adder 144, the output signal of the compensator 103 is subtracted from the torque command τr.

The control device of the reference example includes a circuit in which an acceleration of the servo motor 55 is fed back and can restrain a vibration of the torque command τr. However, when a response property of the position controller 71 and the speed controller 72 is increased, a drive of the servo motor 55 may be unstable. For example, when a gain in the position controller 71 or a gain in the speed controller 72 is increased, an oscillation may be generated. In addition, since the optimal gain K1 in the compensator 103 changes depending on a type of the machine structure 57, setting the gain K1 has been difficult.

With reference to FIG. 10, the servo motor control part 54 of the control device 50 according to the present embodiment includes a stabilization compensation circuit 123 for motor. In addition, the speed detector 58 which detects a speed of the servo motor 55 is used as the state sensor. A speed signal outputted from the speed detector 58 is inputted into the differentiator 78. The differentiator 78 outputs an acceleration signal. The acceleration signal is multiplied by a gain Kv1 in the compensator 91. An output signal of the compensator 91 is inputted into the adder 144 through the adder 141 and the filter 81. In the adder 144, an output signal of the adder 141 is subtracted from the torque command τr outputted from the speed controller 72. In other words, a circuit in which an acceleration of the servo motor 55 is fed back is configured. As the filter 81, a filter such as a low pass filter, which allows a desired frequency band to pass can be used.

Further, the acceleration signal outputted from the differentiator 78 turns into a speed signal by passing through the integrator 77a. The speed signal is multiplied by a gain Kv2 by the compensator 92. An output signal of the compensator 92 is inputted into the adder 141 through the adder 142. In other words, a circuit in which a speed of the servo motor 55 is fed back is configured.

The speed signal outputted from the integrator 77a is inputted into the integrator 77b. A position signal outputted from the integrator 77b is multiplied by a gain Kv3 in the compensator 93. An output signal of the compensator 93 is inputted into the adder 141 through the adder 142. In other words, a circuit in which a position of the servo motor 55 is fed back is configured.

In the adder 142, the output signal of the compensator 92 and the output signal of the compensator 93 are added. In the adder 141, an output signal of the adder 142 is added to the output signal of the compensator 91. In other words, a feedback signal of a speed and a feedback signal of a position are added to a feedback signal of an acceleration of the servo motor. Thus, a state of the servo motor 55 can be fed back and stabilizing a drive of the motor can be performed. As a result, a vibration of the machine structure 57 can be restrained. In addition, a response property of the position controller 71 and the speed controller 72 can be increased.

In addition, in circuits of the respective feedback signals, the gain Kv1 of the compensator 91, the gain Kv2 of the compensator 92, and the gain Kv3 of the compensator 93 can be independently set. Accordingly, an influence by an acceleration can be adjusted by the gain Kv1, an influence by a speed can be adjusted by the gain Kv2, and further, an influence by a position can be adjusted by the gain Kv3. A value of the gains Kv1, Kv2, Kv3 is set to be an appropriate value, whereby a drive of the servo motor 55 can be effectively stabilized and a vibration of the machine structure 57 can be effectively restrained.

In the control device according to the present embodiment, a speed detected by the speed detector 58 is converted into an acceleration and then is again converted into a speed, but this configuration is not limitative, and as the speed feedback signal, an output signal of the speed detector 58 may be multiplied by the gain Kv2. In addition, as the position feedback signal, the output signal of the speed detector 58 may be integrated and multiplied by the gain Kv3.

The other configurations, operations, and effects are similar to the first embodiment, description of which will not be accordingly repeated.

Fourth Embodiment

The feed axis control method of the machine tool and the numerical control machine tool according to a fourth embodiment will be described with reference to FIG. 12 and FIG. 13.

The control device according to the present embodiment has a configuration in which configurations of the control circuits from the first embodiment to the third embodiment are combined. In other words, the control device includes the stabilization compensation circuit 121 for machine structure according to the first embodiment, the stabilization compensation circuit 122 for axis feed mechanism according to the second embodiment, and the stabilization compensation circuit 123 for motor according to the third embodiment.

Figure 12:
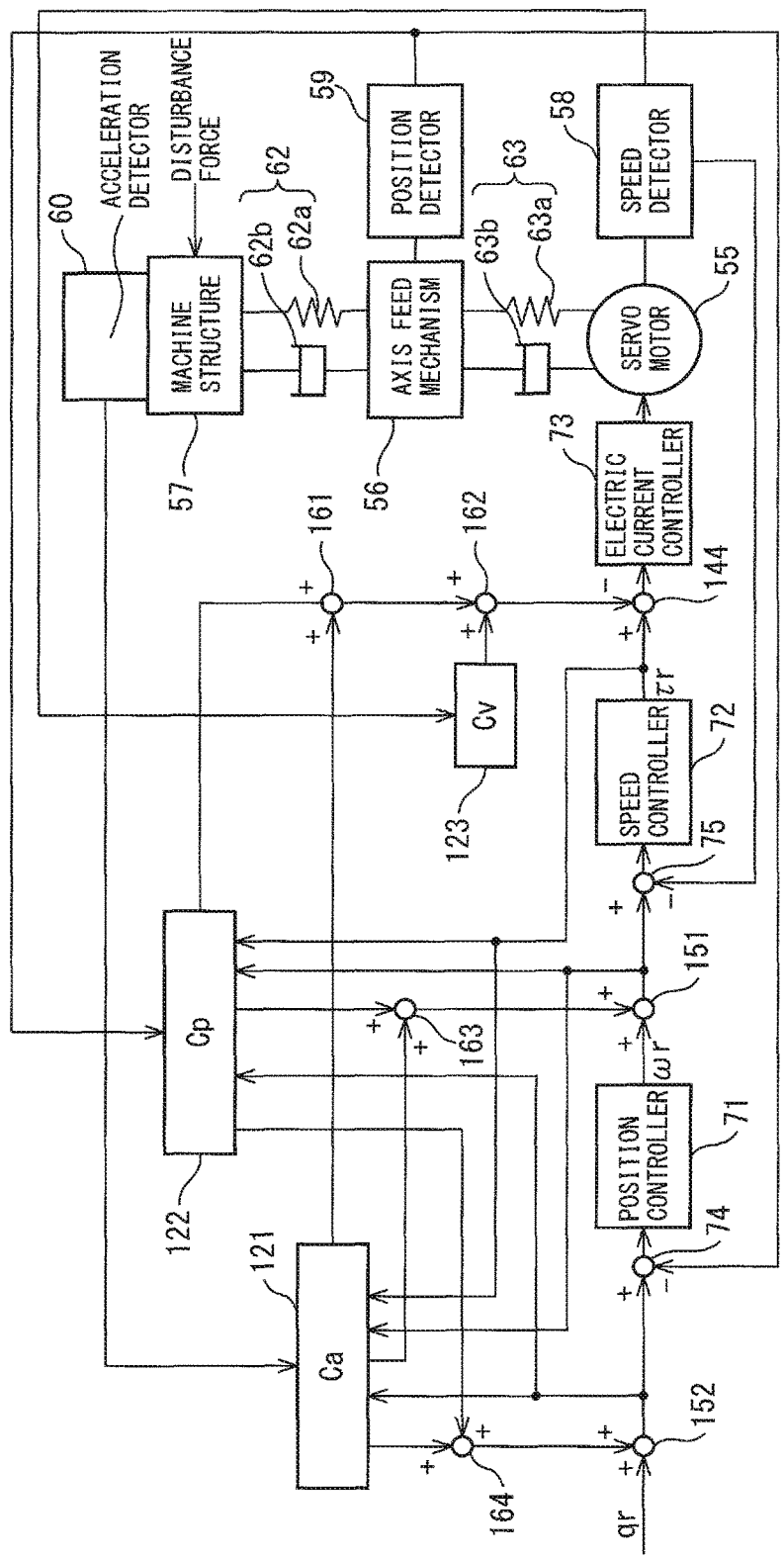
FIG. 12 is a block diagram of the first control device and the drive mechanism of the machine structure according to a fourth embodiment.

FIG. 12 shows a block diagram of the first control device and the drive mechanism of the machine structure according to the present embodiment. The elastic element 63 is interposed between the servo motor 55 and the axis feed mechanism 56. Between the axis feed mechanism 56 and the machine structure 57, the elastic element 62 is interposed. In other words, the machine tool according to the present embodiment includes three inertial systems in which the machine structure 57 and the axis feed mechanism 56 are spring-connected and further the axis feed mechanism 56 and the servo motor 55 are spring-connected.

The first control device according to the present embodiment has a configuration in which the configuration of the first control device according to the first embodiment, the configuration of the first control device according to the second embodiment, and the configuration of the first control device according to the third embodiment are combined. In the position feedback loop, a position signal from the position detector 59 is used.

The acceleration detector 60 is disposed at the machine structure 57. An acceleration signal outputted from the acceleration detector 60 is transmitted to the stabilization compensation circuit 121 for machine structure. The position detector 59 is disposed at the axis feed mechanism 56. A position signal outputted from the position detector 59 is transmitted to the stabilization compensation circuit 122 for axis feed mechanism. Further, to the servo motor 55, the speed detector 58 is attached. A speed signal outputted from the speed detector 58 is transmitted to the stabilization compensation circuit 123 for motor.

In the respective stabilization compensation circuits 121, 122, 123, a correction signal with respect to an acceleration is generated, and is added in adders 161, 162. An acceleration feedback circuit is configured. An output signal of the adder 162 is subtracted from the torque command τr in the adder 144.

In addition, in the stabilization compensation circuit 121 for machine structure and the stabilization compensation circuit 122 for axis feed mechanism, a correction signal with respect to a speed for cancelling a speed deflection generated due to the acceleration feedback circuit is generated and added in an adder 163. An output signal of the adder 163 is added to the speed command ωr in the adder 151. Further, in the stabilization compensation circuit 121 for machine structure and the stabilization compensation circuit 122 for axis feed mechanism, a correction signal with respect to a position for cancelling a position deflection generated due to the acceleration feedback circuit is generated and added in an adder 164. An output signal of the adder 164 is added to the position command qr in the adder 152.

Figure 13:
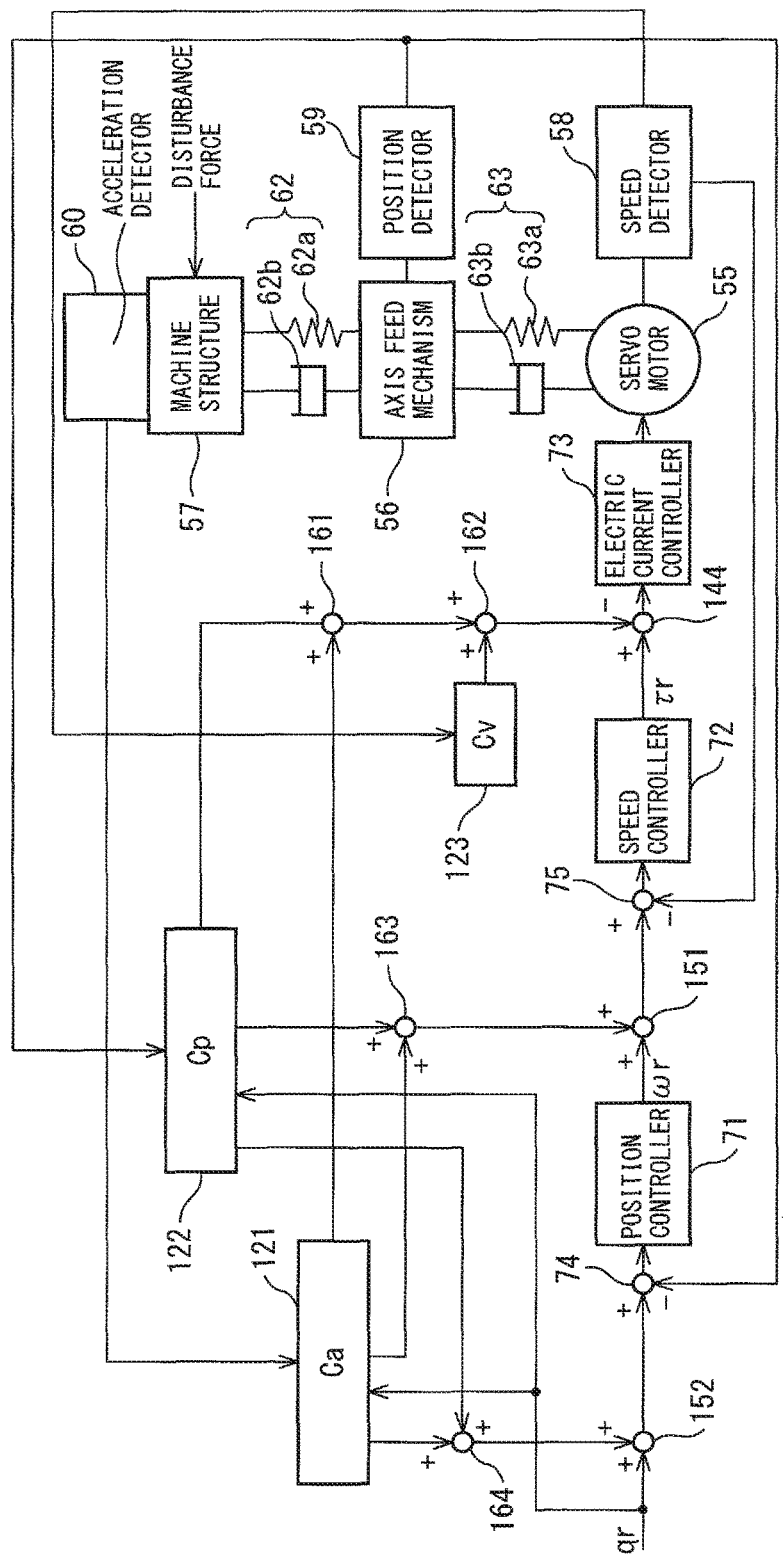
FIG. 13 is a block diagram of the second control device and the drive mechanism of the machine structure according to the fourth embodiment.

FIG. 13 shows a block diagram of the second control device and the drive mechanism of the machine structure according to the present embodiment. The second control device according to the present embodiment has a configuration in which the configuration of the second control device according to the first embodiment, the configuration of the second control device according to the second embodiment, and the configuration of the second control device according to the third embodiment are combined.

In the second control device, as the feed axis command inputted into the stabilization compensation circuit 121 for machine structure and the stabilization compensation circuit 122 for axis feed mechanism, the position command qr uncorrected is inputted. The position command qr outputted from the interpolation calculation part 53 is inputted into the stabilization compensation circuit 121 for machine structure and the stabilization compensation circuit 122 for axis feed mechanism. The other configurations are similar to the first control device according to the first embodiment.

Thus, in the machine tool including the three inertial systems, the control circuit according to the first embodiment and the control circuit according to the second embodiment are combined, whereby a vibration of the machine structure 57 can be restrained. Further, the control circuit for stabilizing a drive of the servo motor 55 according to the third embodiment is combined, whereby the stabilization control including stabilizing a drive of the servo motor 55 can be performed.

The control device according to the present embodiment includes three stabilization compensation circuits which are the stabilization compensation circuit 121 for machine structure, the stabilization compensation circuit 122 for axis feed mechanism, and the stabilization compensation circuit 123 for motor, but this configuration is not limitative, and, out of the three stabilization compensation circuits, two optional stabilization compensation circuits may be included.

The other configurations, operations, and effects are similar to any of the first to three embodiments, description of which will not be accordingly repeated.

The embodiments as described above can be suitably combined. In each control as described above, the order of the steps can be changed within a range in which functions and operations are not changed.

In each drawing as described above, the same or similar components are assigned the same reference signs. Note that the embodiments as described above are illustrative and are not to limit the invention. Moreover, the embodiments include modifications of the embodiments recited in the claims.

REFERENCE SIGNS LIST

1 workpiece
10 machine tool
14 table
20 spindle
22 tool
25 Z-axis servo motor
28 Z-axis guide rail
29, 33, 39 speed detector
30 Z-axis linear scale
31 Y-axis servo motor
32 Y-axis guide rail
34 Y-axis linear scale
36 X-axis guide rail
38 X-axis servo motor
40 X-axis linear scale
45, 46 acceleration detector
50 control device
54 servo motor control part
55 servo motor
56 axis feed mechanism
57 machine structure
58 speed detector
59 position detector
60 acceleration detector
71 position controller
72 speed controller
91-96 compensator
101-102 compensator
121 stabilization compensation circuit for machine structure
122 stabilization compensation circuit for axis feed mechanism
123 stabilization compensation circuit for motor

The invention claimed is:

1. A method of machining a workpiece using a machine tool that includes a control device in which a cascade connection in which a speed feedback loop including a speed control part into which a speed command is inputted is provided inside a position feedback loop including a position control part into which a position command is inputted, the control device controlling a servo motor for driving a feed axis in accordance with a torque command outputted from the speed control part, the machine tool including one of an elastic element disposed between a machine structure and an axis feed mechanism and an elastic element disposed between the axis feed mechanism and the servo motor, the method comprising:

obtaining an acceleration based on an output signal of a state sensor attached to at least one of the machine structure and the axis feed mechanism, and subtracting an acceleration feedback signal in which only the obtained acceleration is multiplied by a predetermined first gain from the torque command outputted from the speed control part;

performing at least one of controls comprising a control in which a speed is obtained based on the output signal of the state sensor and a signal in which the obtained speed is multiplied by a predetermined gain is added to the speed command outputted from the position control part, and a control in which a position is obtained based on the output signal of the state sensor and a signal in which the obtained position is multiplied by a predetermined gain is added to the position command inputted into the position control part; and machining the workpiece using the torque command after the subtraction to reduce the vibration due to the existing elastic element.

2. The method of claim 1, wherein a speed is obtained based on an output signal of the state sensor, and a signal in which the obtained speed is multiplied by a predetermined second gain is added to the acceleration feedback signal.

3. The method of claim 2, wherein a signal in which the speed command outputted from the position control part is multiplied by a predetermined third gain is subtracted from a signal multiplied by the second gain.

4. The method of claim 1, wherein a position is obtained based on an output signal of the state sensor, and a signal in which the obtained position is multiplied by a predetermined fourth gain is added to the acceleration feedback signal.

5. The method of claim 4, wherein a signal in which the position command inputted into the position control part is multiplied by a predetermined fifth gain is subtracted from a signal multiplied by the fourth gain.

6. The method of claim 1, wherein a signal in which the torque command outputted from the speed control part is multiplied by a predetermined sixth gain is subtracted from the acceleration feedback signal.

7. The feed axis control method of claim 2, wherein the first gain and the second gain are set so that an additional value of a square of the first gain and a square of the second gain is a predetermined set value.

8. A feed axis control method of a machine tool that includes a control device in which a cascade connection in which a speed feedback loop including a speed control part into which a speed command is inputted is provided inside a position feedback loop including a position control part into which a position command is inputted, the control device controlling a servo motor for driving a feed axis in accordance with a torque command outputted from the speed control part, the machine tool including one of an elastic element disposed between a machine structure and an axis feed mechanism and an elastic element disposed between the axis feed mechanism and the servo motor, the method comprising:

obtaining an acceleration based on an output signal of a state sensor attached to at least one of the machine structure and the axis feed mechanism, and subtracting an acceleration feedback signal in which only the obtained acceleration is multiplied by a predetermined gain from the torque command outputted from the speed control part;

performing at least one of controls comprising a control in which a speed is obtained based on the output signal of the state sensor and a signal in which the obtained speed is multiplied by a predetermined gain is added to the acceleration feedback signal and a control in which a position is obtained based on the output signal of the state sensor and a signal in which the obtained position is multiplied by a predetermined gain is added to the acceleration feedback signal; and machining the workpiece using the torque command after the subtraction to reduce the vibration due to the existing elastic element.

9. A numerical control machine tool comprising a control device in which a cascade connection in which a speed feedback loop including a speed control part into which a speed command is inputted is provided inside a position feedback loop including a position control part into which a position command is inputted is formed, the control device controlling a servo motor for driving a feed axis in accordance with a torque command outputted from the speed control part, the machine tool including one of an elastic element disposed between a machine structure and an axis feed mechanism and an elastic element disposed between the axis feed mechanism and the servo motor, wherein the control device includes a circuit in which a signal in which an acceleration is obtained based on an output signal of a state sensor attached to at least one of the machine structure and the axis feed mechanism and a signal in which only the obtained acceleration is multiplied by a predetermined gain is subtracted from the torque command outputted from the speed control part, and further includes at least one of circuits comprising a circuit in which a speed is obtained based on the output signal of the state sensor and a signal in which the obtained speed is multiplied by a predetermined gain is added to the speed command outputted from the position control part and a circuit in which a position is obtained based on the output signal of the state sensor and a signal in which the obtained position is multiplied by a predetermined gain is added to the position command inputted into the position control part, and wherein the workpiece is machined using the torque command after the subtraction to reduce the vibration due to the existing elastic element.

10. A numerical control machine tool comprising a control device in which a cascade connection in which a speed feedback loop including a speed control part into which a speed command is inputted is provided inside a position feedback loop including a position control part into which a position command is inputted is formed, the control device controlling a servo motor for driving a feed axis in accordance with a torque command outputted from the speed control part, the machine tool including one of an elastic element disposed between a machine structure and an axis feed mechanism and an elastic element disposed between the axis feed mechanism and the servo motor, wherein the control device includes a circuit in which an acceleration is obtained based on an output signal of a state sensor attached to at least one of the machine structure and the axis feed mechanism and an acceleration feedback signal in which only the obtained acceleration is multiplied by a predetermined gain is subtracted from the torque command outputted from the speed control part, and further includes at least one of circuits comprising a circuit in which a speed is obtained based on the output signal of the state sensor and a signal in which the obtained speed is multiplied by a predetermined gain is added to the acceleration feedback signal and a circuit in which a position is obtained based on the output signal of the state sensor and a signal in which the obtained position is multiplied by a predetermined gain is added to the acceleration feedback signal, and wherein the workpiece is machined using the torque command after the subtraction to reduce the vibration due to the existing elastic element.

11. The numerical control machine tool of claim 9, comprising:
a table to which a workpiece is fixed;
a tool support member which supports a tool; and
a movement device which moves the table and the tool support member; wherein
the state sensor includes an acceleration detector disposed at the table and an acceleration detector disposed at the tool support member.

* * * * *